United States Patent
Higurashi

(10) Patent No.: US 9,827,642 B2
(45) Date of Patent: Nov. 28, 2017

(54) CLAMPING DEVICE

(75) Inventor: Takuya Higurashi, Abiko (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 14/240,651

(22) PCT Filed: Aug. 23, 2012

(86) PCT No.: PCT/JP2012/071345
§ 371 (c)(1),
(2), (4) Date: Feb. 24, 2014

(87) PCT Pub. No.: WO2013/031652
PCT Pub. Date: Mar. 7, 2013

(65) Prior Publication Data
US 2014/0232051 A1    Aug. 21, 2014

(30) Foreign Application Priority Data

Sep. 2, 2011    (JP) ................... 2011-191170

(51) Int. Cl.
*B23Q 3/00* (2006.01)
*B23Q 17/00* (2006.01)
(Continued)

(52) U.S. Cl.
CPC ............. *B23Q 17/002* (2013.01); *B23Q 3/08* (2013.01); *B25B 5/122* (2013.01); *B25B 5/16* (2013.01); *G01B 7/003* (2013.01)

(58) Field of Classification Search
USPC .............................. 269/20, 27, 32, 228, 329
See application file for complete search history.

(56) References Cited

U.S. PATENT DOCUMENTS 5,996,984 A * 12/1999 Takahashi ................. B25B 5/16
269/228
6,364,301 B1    4/2002 Takahashi
(Continued)

FOREIGN PATENT DOCUMENTS

CN          1513641 A      7/2004
DE       296 14 630 U1    1/1998
(Continued)

OTHER PUBLICATIONS

International Search Report dated Nov. 13, 2012 in PCT/JP12/071345 Filed Aug. 23, 2012.
(Continued)

*Primary Examiner* — Joseph J Hail
*Assistant Examiner* — Shantese McDonald
(74) *Attorney, Agent, or Firm* — Oblon, McClelland, Maier & Neustadt, L.L.P.

(57) ABSTRACT

In a clamping device, a detection mechanism detects a state of clamping/unclamping and includes: a detected body that moves together with a piston and a piston rod; a circuit board disposed to face the detected body and capable of detecting the position of the detected body; and an indicator lamp that is connected to the circuit board and is lit/extinguished depending on the state of clamping/unclamping. By pressing a setting button provided on the detection mechanism when the rotation angle of the arm is changed, the second detection position of the circuit board for detecting the unclamped state is changed, making it possible to detect the detected body at a newly set detection position.

12 Claims, 8 Drawing Sheets

(51) Int. Cl.
  *B25B 5/12*   (2006.01)
  *B25B 5/16*   (2006.01)
  *G01B 7/00*   (2006.01)
  *B23Q 3/08*   (2006.01)

(56) References Cited

U.S. PATENT DOCUMENTS

| | | | |
|---|---|---|---|
| 6,644,638 B1 * | 11/2003 | McCormick | B25B 5/12 |
| | | | 269/225 |
| 6,877,730 B2 * | 4/2005 | Sawdon | B25B 5/16 |
| | | | 269/228 |
| 8,146,900 B2 * | 4/2012 | Miyashita | B23K 37/0435 |
| | | | 269/228 |
| 2002/0195762 A1 | 12/2002 | McCormick et al. | |
| 2006/0197270 A1 | 9/2006 | Migliori | |
| 2008/0197553 A1 * | 8/2008 | Rudaitis | B25B 5/122 |
| | | | 269/90 |
| 2009/0283948 A1 * | 11/2009 | Fukui | B25B 5/16 |
| | | | 269/32 |

FOREIGN PATENT DOCUMENTS

| | | |
|---|---|---|
| DE | 200 04 406 U1 | 6/2000 |
| DE | 10 2004 007 346 B3 | 4/2005 |
| EP | 0 938 952 A2 | 9/1999 |
| JP | 2001 113468 | 4/2001 |
| JP | 2002 48505 | 2/2002 |
| JP | 2004 255559 | 9/2004 |
| JP | 2008 30178 | 2/2008 |

OTHER PUBLICATIONS

Extended European Search Report dated Oct. 15, 2015 in Patent Application No. 12826884.4.

Combined Office Action and Search Report dated Apr. 25, 2016 in Chinese Patent Application No. 201280042559.X (with English translation).

* cited by examiner

CLAMPING DEVICE

TECHNICAL FIELD

The present invention relates to a clamping device which is capable of clamping a workpiece through a clamp arm rotated a predetermined angle under a displacement action of a piston.

BACKGROUND ART

Heretofore, for example, when welding together component parts of a vehicle or the like, a clamping device has been used for clamping the parts. The present applicant has proposed such a clamping device, having a main body portion, a cylinder connected to the main body portion, and a clamp arm, which is rotated a predetermined angle through a toggle link mechanism disposed in the interior of the main body portion under a driving action of the cylinder (see Japanese Laid-Open Patent Publication No. 2001-113468).

In such a clamping device, a piston and a piston rod of the cylinder are displaced in a axial direction under the action of a pressure fluid supplied to the cylinder, whereby a clamp arm is rotated through an operational angle based on a displacement amount of the piston via the toggle link mechanism that is connected to the piston rod, and the clamping device is switched between a clamped state, at which a workpiece can be clamped, and an unclamped state, at which the workpiece is released from the clamped state.

Further, in the clamping device, a detection member is connected with respect to a knuckle block, which is connected to the piston rod, whereby the rotational state of the clamp arm is detected by detecting the detection member by two proximity switches disposed at respective side portions of the body.

Recently, it has been desired to detect the rotational state of a clamp arm more easily and with greater accuracy.

SUMMARY OF INVENTION

The present invention is related to the aforementioned proposal, and has an object of providing a clamping device in which, even in the case that the angle of rotation of a clamp arm is changed, the rotational state of the clamp arm can be detected easily and with high accuracy.

To achieve the above object, the present invention is characterized by a clamping device for clamping a workpiece with a clamp arm, by converting linear motion in a cylinder into rotational motion through a toggle link mechanism, the clamping device comprising:

a main body portion;

a cylinder connected to the main body portion and having a piston and a piston rod therein which are displaced in an axial direction under a pressing action of a pressure fluid;

an adjustment mechanism disposed displaceably in the cylinder, and which is capable of adjusting a stroke displacement amount of the piston by regulating displacement of the piston;

a detecting mechanism having a detection body that is stroke-displaced together with the piston and the piston rod, and a detecting section, which is capable of detecting a position of the detection body, wherein the detecting mechanism detects clamped and unclamped states of the workpiece by the clamp arm by detecting, with the detecting section, a position at which the detection body is stroke-displaced; and a position setting means for setting a detection position of the detection body by the detecting section, when the stroke displacement amount is adjusted by the adjustment mechanism.

According to the present invention, in the clamping device, in the case that the angle of rotation of the clamp arm is changed by adjusting the stroke displacement amount of the piston using the adjustment mechanism, since it is possible to change and set, with the position setting means, the detection position at which the detection body of the detecting mechanism is detected by the detecting section, for example, it is unnecessary for an adjustment operation to be carried out by removing the detecting mechanism from the main body portion every time that the angle of rotation of the clamp arm is changed, and thus the operation to change the detection position can be performed easily responsive to the change in the angle of rotation. As a result, adjustment of the angle of rotation of the clamp arm can be performed reliably and efficiently, and accordingly the rotational state of the clamp arm can be detected highly accurately.

Further, the position setting means may be constituted from a switch, which is connected electrically with respect to the detecting section, and which sets the detection position of the detecting section corresponding to the clamped state or the unclamped state, by being pressed in the case that the clamp arm is in the clamped state or the unclamped state.

Furthermore, the detection body may include:

a holder which is supported by a connecting arm that is connected to the piston rod; and a detection element having magnetism and which is accommodated in the interior of the holder, wherein the magnetism of the detection element is detected by the detecting section.

Further still, the detection element may be constituted from a coil.

Still further, the detecting mechanism may include a display lamp that is illuminated in the clamped state and the unclamped state of the workpiece, the display lamp being disposed in the detecting mechanism at a position where the display lamp can be perceived visually from the exterior.

Further, the display lamp may include:

a first display lamp that is illuminated in the clamped state; and a second display lamp that is illuminated in the unclamped state, wherein the first display lamp and the second display lamp have different colors respectively.

According to the present invention, the following advantages and effects are obtained.

More specifically, in the case that the angle of rotation of the clamp arm is changed by adjusting the stroke displacement amount of the piston using the adjustment mechanism, since it is possible to change and set, with the position setting means, the detection position at which the detection body of the detecting mechanism is detected by the detecting section, for example, it is unnecessary for an adjustment operation to be carried out by removing the detecting mechanism from the main body portion every time that the angle of rotation of the clamp arm is changed, and thus the operation to change the detection position can be performed easily responsive to the change in the angle of rotation. As a result, the adjustment of the angle of rotation of the clamp arm can be performed reliably and effectively, and the rotational state of the clamp arm can be detected with high accuracy.

The above and other objects, features and advantages of the present invention will become more apparent from the

DESCRIPTION OF EMBODIMENTS

Figure 1:
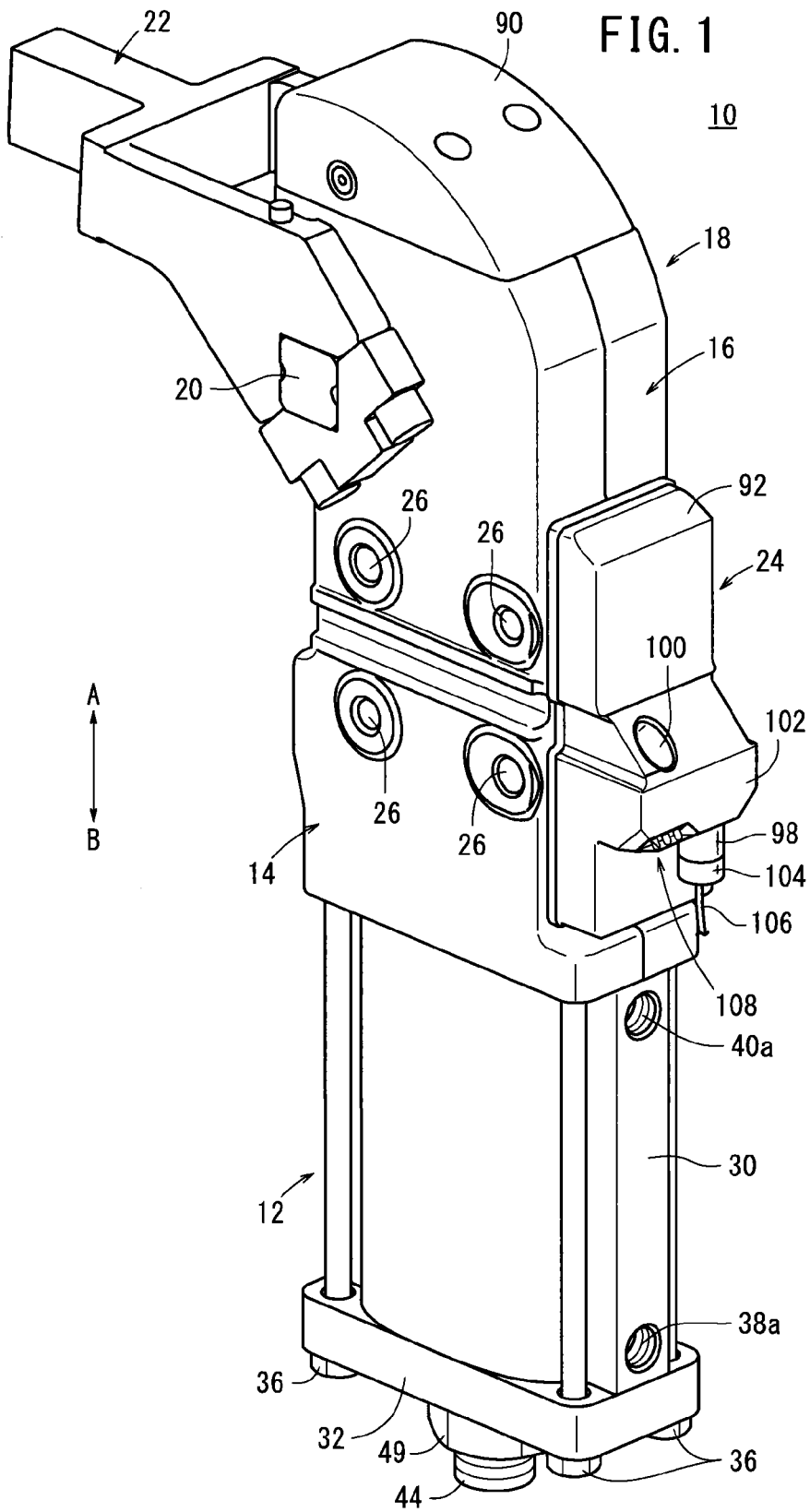
FIG. 1 is an exterior perspective view of a clamping device according to an embodiment of the present invention.

A preferred embodiment of a clamping device according to the present invention will be described in detail below with reference to the accompanying drawings. In FIG. 1, reference numeral 10 indicates a clamping device according to an embodiment of the present invention.

Figure 2:
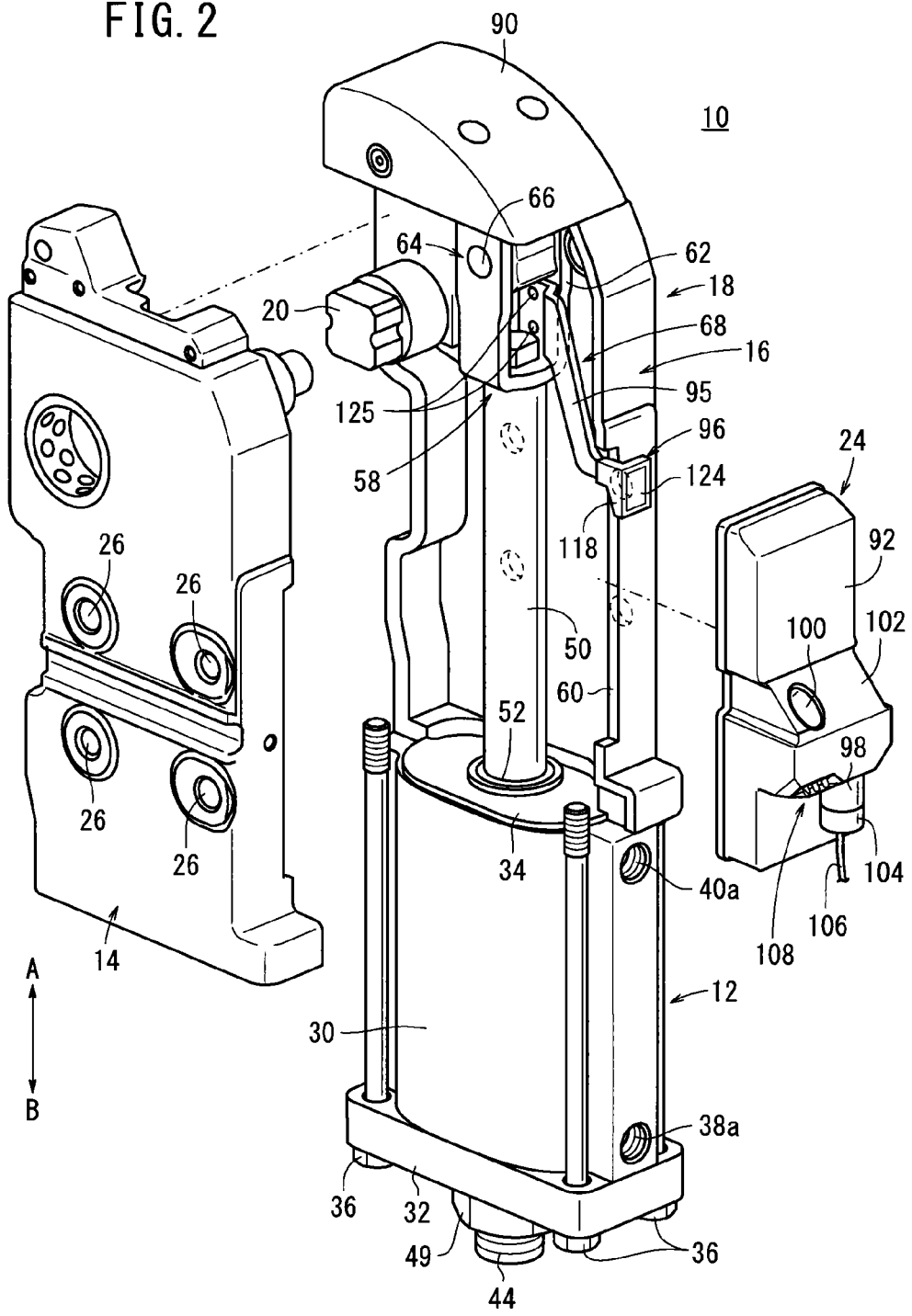
FIG. 2 is a partial exploded perspective view showing a condition in which a first casing and a switch housing are removed from the clamping device of FIG. 1.
Figure 3:
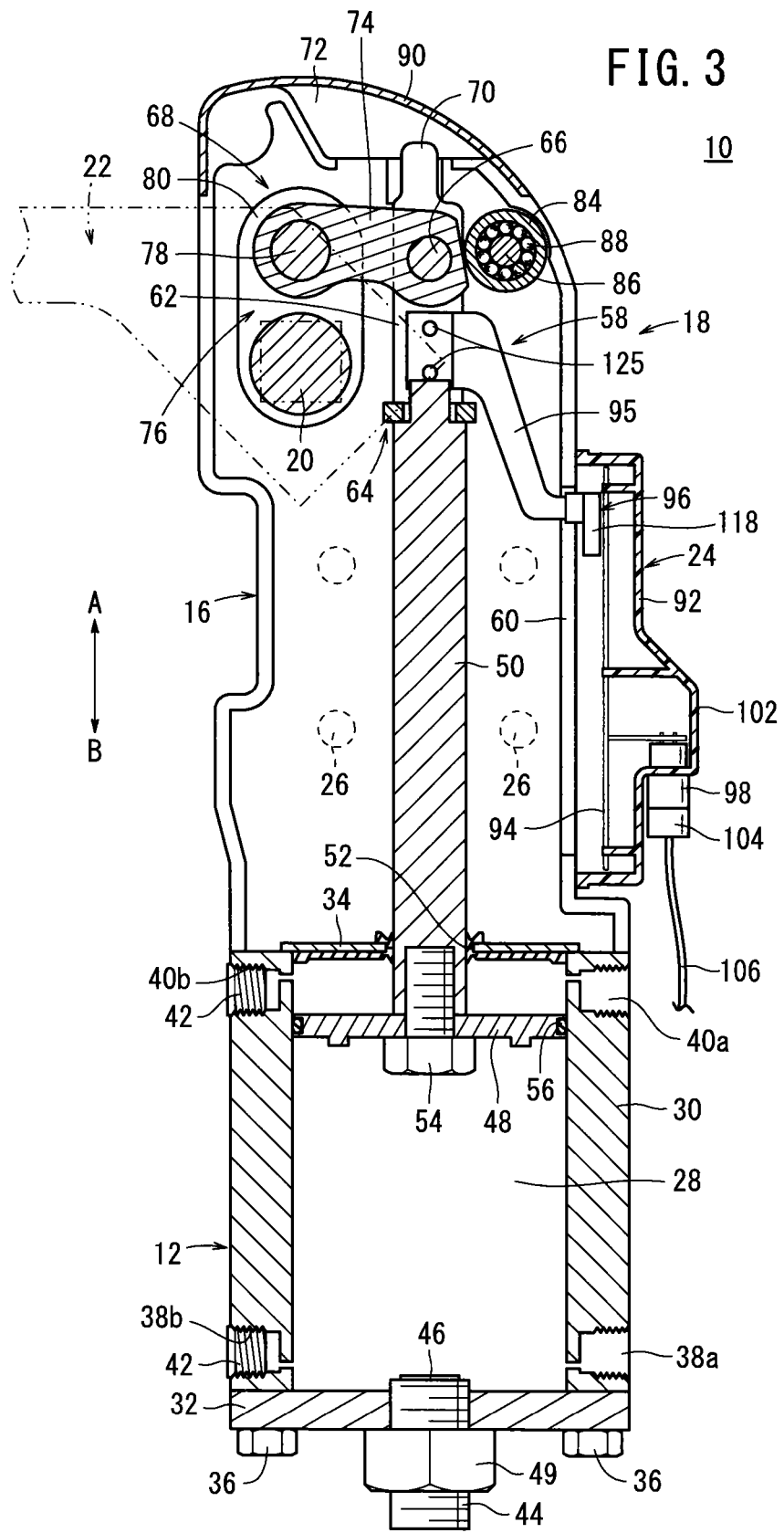
FIG. 3 is an overall cross-sectional view with partial omission of the clamping device shown in FIG. 1.

As shown in FIGS. 1 through 3, the clamping device 10 is equipped with a cylinder 12 driven under a supply action of a pressure fluid, a body (main body portion) 18 connected to an upper end of the cylinder 12 and which is formed in a flat shape from first and second casings 14, 16, an arm (clamp arm) 22, which is connected to rectangular bearings 20 that project outwardly from the body 18, and a detecting mechanism 24 disposed on a side of the body 18 for detecting clamped and unclamped states of a workpiece (not shown) by the arm 22. On a side surface of the body 18, plural attachment holes 26 are formed to facilitate attachment of the clamping device 10 to another member by non-illustrated attachment screws, which are screw-engaged therein.

The cylinder 12 includes a hollow cylinder tube 30 having a cylinder chamber 28 defined therein, an end block 32 connected to one end of the cylinder tube 30 for closing the cylinder chamber 28, and an end plate 34 for closing and sealing the other end of the cylinder tube 30. In this case, although the cylinder tube 30 is formed with a flat shape in cross section, the cylinder tube 30 is not limited to such a shape, and may be formed, for example, with an oval or circular cross-sectional shape.

Through holes (not shown) that penetrate in the axial direction (the direction of arrows A and B) are formed in the four corners of the end block 32. By insertion of fastening bolts 36 (see FIGS. 1 and 2) respectively in the through holes and tightening the fastening bolts 36 with respect to the body 18, the cylinder tube 30 and the end plate 34 are sandwiched between the end block 32 and the body 18, and the end block 32, the cylinder tube 30, and the end plate 34 are connected integrally with respect to the body 18.

As shown in FIG. 3, on side surfaces of the cylinder tube 30, a pair of first fluid ports 38a, 38b through which a pressure fluid (e.g., compressed air) is introduced and discharged are formed at positions in the vicinity of the end block 32, and a pair of second fluid ports 40a, 40b through which the pressure fluid (e.g., compressed air) is introduced and discharged are formed at positions in the vicinity of the end plate 34.

The first fluid ports 38a, 38b and the second fluid ports 40a, 40b are separated by a predetermined distance in the axial direction of the cylinder tube 30 (the direction of arrows A and B), and are formed on opposite side surfaces at substantially symmetrical positions with respect to the axis of the cylinder tube 30.

In addition, in each of the pairs of the first and second fluid ports 38a, 38b, 40a, 40b, only one of the two ports is used selectively, whereas, for example, the first and second fluid ports 38b, 40b, which are not used, are blocked respectively by plugs 42 (see FIG. 3). Moreover, each of the first and second fluid ports 38a, 38b, 40a, 40b communicates with the cylinder chamber 28.

An adjustment bolt 44 is screw-engaged from below substantially in the center of the end block 32, and an end of the adjustment bolt 44 projects a predetermined length into the interior of the cylinder chamber 28. The adjustment bolt 44, for example, is constituted from a stud bolt, with a damper 46, which is formed, for example, from a rubber material, being mounted on the end thereof. Additionally, a connecting bolt 54, which is fastened to a later-described piston 48 of the cylinder 12, comes into abutment against the adjustment bolt 44, whereby displacement of the piston 48 is regulated, and shocks and impact sounds, which are generated upon abutment, are suitably absorbed by the damper 46 (see FIG. 8).

Further, under a screw-turning action of the adjustment bolt 44, the adjustment bolt 44 is disposed while enabling displacement thereof along the axial direction (the direction of arrows A and B) of the cylinder tube 30. A lock nut 49 is screw-engaged with the adjustment bolt 44 on the outside of the end block 32. In addition, by changing the length at which the adjustment bolt 44 projects toward the side of the cylinder chamber 28 (in the direction of the arrow A), the displacement amount (stroke amount) in the axial direction (the direction of the arrow B) of the piston 48 is adjusted. Together therewith, after adjustment thereof, the lock nut 49 is screw-engaged with respect to the adjustment bolt 44, and comes into abutment against the end surface of the end block 32, whereby displacement of the adjustment bolt 44 in the axial direction (the direction of arrows A and B) is restricted and the adjustment bolt 44 is fixed in place.

More specifically, the adjustment bolt 44 functions as an adjustment mechanism that is capable of adjusting the angle of rotation of the arm 22 by adjustment of the displacement amount of the piston 48.

The end plate 34 includes a hole 52 that penetrates substantially through the center thereof. A piston rod 50 of the later-described cylinder 12 is inserted through the hole 52, and the end plate 34 supports the piston rod 50 for displacement along the axial direction (the direction of arrows A and B).

On the other hand, the piston 48, which is displaceable along the cylinder chamber 28, is disposed in the interior of the cylinder tube 30. An end of the elongate piston rod 50 is connected by the connecting bolt 54 to a center portion of the piston 48. A piston packing 56 is installed through an annular groove on the outer circumferential surface of the piston 48. In this case, the piston 48 is displaced in a direction (the direction of the arrow B) away from the body 18, and by the connecting bolt 54 coming into abutment against the damper 46 provided on the adjustment bolt 44, displacement of the piston 48 is regulated at a displacement end position (lower limit position), and together therewith, shocks that occur upon abutment of the piston 48 are buffered by the damper 46. Further, the piston rod 50 is arranged so as to extend (in the direction of the arrow A) toward the body 18.

The body 18 is constituted from the first casing 14 and the second casing 16, which are asymmetrically shaped, and the first casing 14 and the second casing 16 are assembled together integrally.

Guide grooves (not shown) are formed along the axial direction (the direction of arrows A and B) respectively on inner wall surfaces of the first casing 14 and the second casing 16. A knuckle joint 58, which is connected to the other end of the piston rod 50, is slidably disposed in the guide grooves.

Further, a slit 60 that opens over a predetermined length in the axial direction (the direction of arrows A and B) is formed in a side surface of the body 18. A connecting arm 95 of the later-described detecting mechanism 24 is inserted through the slit 60.

The knuckle joint 58 is constituted from a knuckle block 64 having a forked member 62 that branches into two portions substantially in parallel while the two portions being separated a predetermined distance from each other, and a knuckle pin 66 that is inserted through holes formed in the forked member 62. Further, a toggle link mechanism 68 is provided for converting linear motion of the piston rod 50 into rotational motion of the arm 22.

Further, upwardly projecting release projections 70 are disposed on the forked member 62 of the knuckle block 64. The release projections 70 are disposed so as to project a predetermined length from a substantially rectangular opening 72 formed on an upper portion of the first and second casings 14, 16 when a workpiece is clamped by the arm 22.

The toggle link mechanism 68 is disposed in the interior of the body 18, and includes a link plate 74, which is connected via the knuckle pin 66 between the two portions of the forked member 62 of the knuckle joint 58, and a support lever 76, which is supported rotatably in openings formed respectively in the first and second casings 14, 16. By providing the toggle link mechanism 68 in the interior of the body 18, adhesion of spatter or the like, which is scattered throughout the atmosphere in the installation environment of the clamping device 10, is prevented.

The link plate 74 is interposed between the knuckle joint 58 and the support lever 76 for carrying out a function to link the knuckle joint 58 and the support lever 76. Two holes, which are separated by a predetermined distance, are formed in the link plate 74. The link plate 74 is connected to the other end of the piston rod 50 through the knuckle joint 58 and the knuckle pin 66, which is supported pivotally in one of the holes of the link plate 74, and is connected to the support lever 76 through a link pin 78, which is supported pivotally in the other hole of the link plate 74.

The support lever 76 includes a fork-shaped support section 80 that pivotally supports the link pin 78, and a pair of the bearings 20 that project in directions substantially perpendicular to the axis of the piston rod 50 and are exposed through openings to the exterior of the body 18. The arm 22, which clamps a non-illustrated workpiece, is mounted detachably to the bearings 20. The arm 22 is disposed for rotation together with the support lever 76 (see FIG. 1).

More specifically, linear motion of the piston rod 50 is transferred to the support lever 76 through the link plate 74 and the knuckle joint 58, and by rotational displacement of the support lever 76 through a predetermined angle, the arm 22, which is mounted on the support lever 76, is rotated.

Furthermore, in the interior of the first and second casings 14, 16, a guide roller 84 is disposed rotatably in a cavity on an upper side portion in the vicinity of the toggle link mechanism 68. The guide roller 84 is pivotally supported through a pin member 86, and in the interior of the guide roller 84, a plurality of needle bearings 88 are mounted along the circumferential direction thereof. More specifically, under a rolling action of the needle bearings 88, the guide roller 84 is disposed while enabling smooth rotation thereof. In addition, under a rotary action of the link plate 74 that constitutes the toggle link mechanism 68, the guide roller 84 is rotatably displaced upon contact with the curved surface of the link plate 74.

On the other hand, at the top portion of the body 18, a top cover 90 is disposed detachably thereon that covers the release projections 70. When the release projections 70 are to be operated, the top cover 90, which is formed, for example, from a rubber material, is taken off from the body 18 so as to expose the release projections 70 to the exterior. In the case that the release projections 70 are not operated, the top portion including the release projections 70 that project from the opening 72 is covered completely by the top cover 90.

Figure 4:
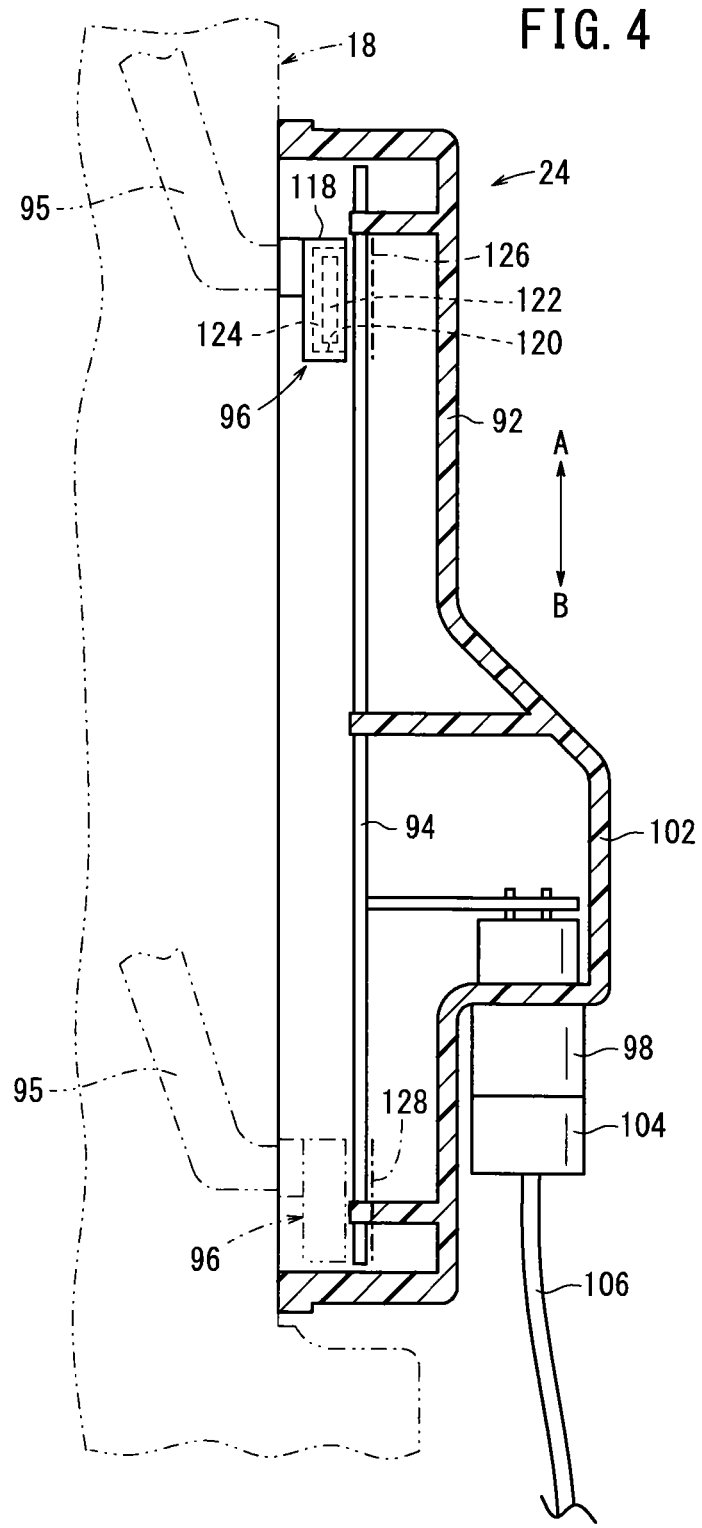
FIG. 4 is an enlarged cross-sectional view showing the vicinity of a detecting mechanism in the clamping device of FIG. 3.
Figure 5:
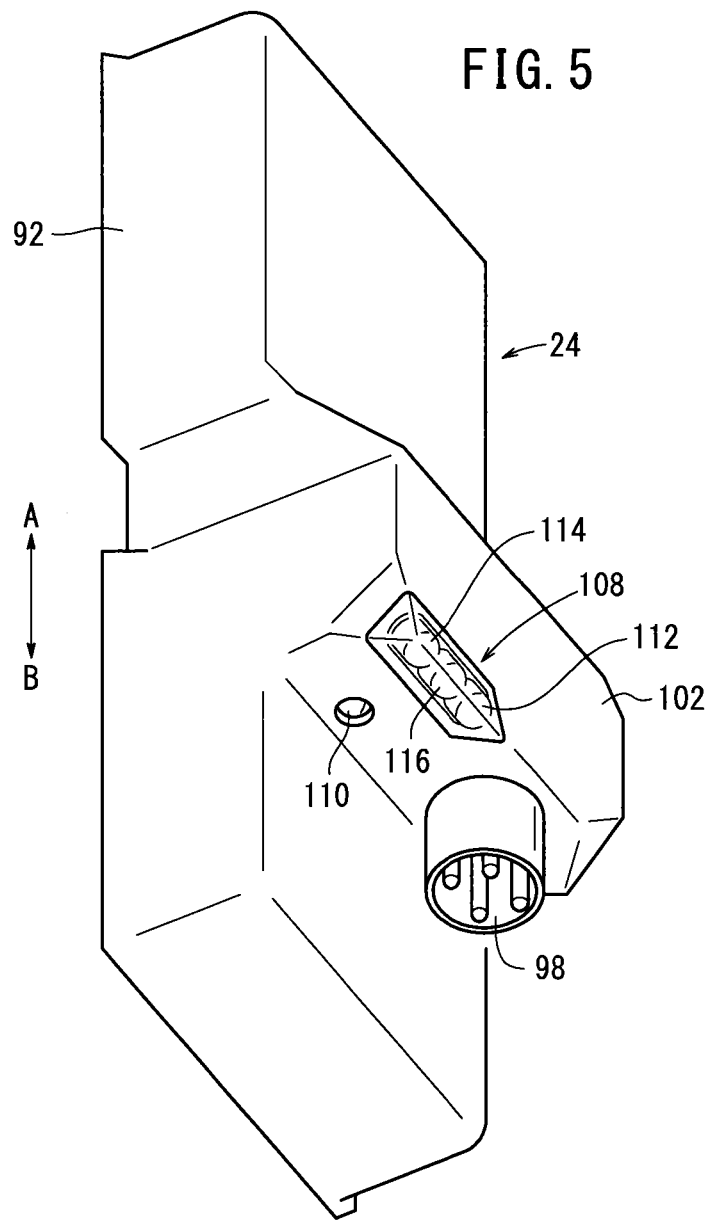
FIG. 5 is an enlarged perspective view showing the vicinity of the detecting mechanism as seen from a lower oblique perspective in the clamping device shown in FIG. 1.
Figure 6:
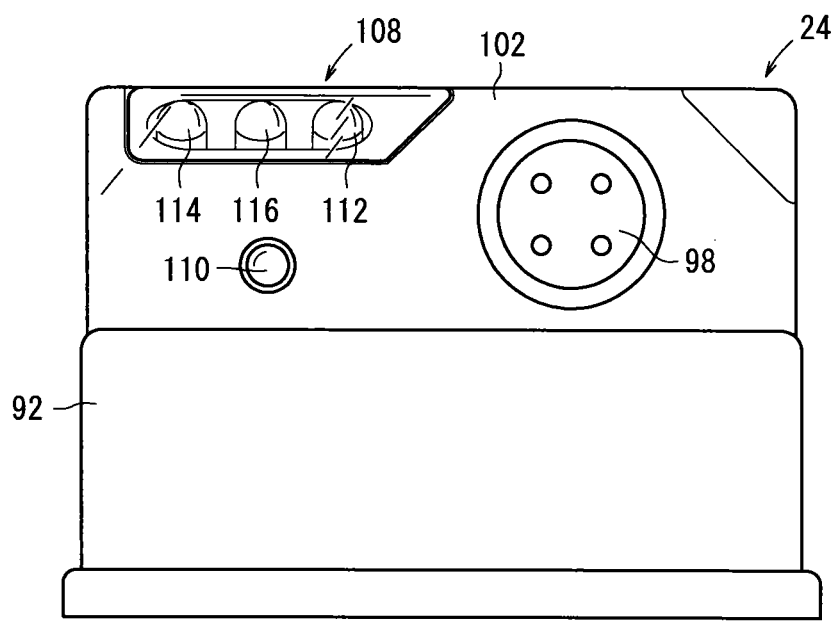
FIG. 6 is a bottom plan view of the switch housing constituting the detecting mechanism shown in FIG. 5.
Figure 7:
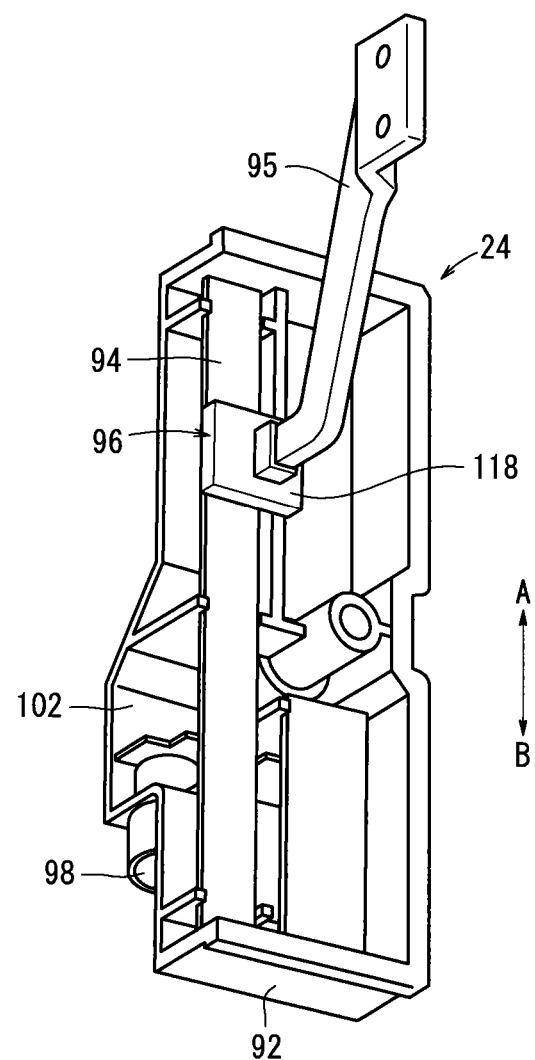
FIG. 7 is a perspective view of the detecting mechanism shown in FIG. 2 as seen from a different direction.

As shown in FIGS. 3 and 4, the detecting mechanism 24 is mounted through bolts (not shown) on a side surface of the first and second casings 14, 16, and includes a switch housing 92, a circuit board (detecting section) 94 disposed in the interior of the switch housing 92, a detection body 96 provided on an end of a connecting arm 95 that is connected to the knuckle block 64 and which is displaced along the circuit board 94, and an output terminal 98 that outputs, to the exterior, a detection signal representing the position of the detection body 96, which is detected by the circuit board 94.

The switch housing 92 is formed, for example, from a resin material and into a box-like shape. The open end thereof is mounted with respect to the side surface of the body 18 on which the slit 60 is formed (see FIGS. 2 and 3). The switch housing 92 is mounted in covering relation to the slit 60. Additionally, a non-illustrated bolt is inserted into a through hole 100 that penetrates perpendicularly to the longitudinal direction (the direction of arrows A and B) of the switch housing 92, and by screw engagement of the bolt with respect to the side surface of the body 18, the switch housing 92 is fixed with respect to the body 18.

Further, the switch housing 92 includes a bulging portion 102 that bulges outwardly in a direction (lateral direction) away from the body 18 in a position near a substantially central portion along the longitudinal direction (the direction of arrows A and B). The output terminal 98 is disposed on the bottom of the bulging portion 102. The bottom of the bulging portion 102 is formed substantially perpendicular to the longitudinal direction (the direction of arrows A and B) of the switch housing 92.

The output terminal 98 is connected electrically to the circuit board 94 in the interior of the switch housing 92, and a portion thereof is exposed to the exterior. In addition, a connector 104 is connected to the output terminal 98 at a region of the output terminal 98 that projects outwardly to the exterior. The position of the detection body 96, which is detected by the circuit board 94, is output as an output signal to a non-illustrated controller through a lead wire 106 that is connected to the connector 104.

Further, on the bottom of the bulging portion 102, a display lamp 108, by which the clamped/unclamped state of the arm 22 can be visually perceived, is disposed at a position that is distanced from the output terminal 98. Together therewith, a setting button (position setting means) 110, which is used when an unclamped state of the arm 22 is recognized, is disposed in the vicinity of the display lamp 108.

Moreover, the display lamp 108 and the setting button 110 are both exposed externally of the switch housing 92, and are connected electrically to the circuit board 94 through non-illustrated wiring or the like.

The display lamp 108 is disposed at a position on the switch housing 92 where the display lamp 108 can easily be seen, and is constituted from a clamped lamp (first display lamp) 112, which is illuminated when the arm 22 is in a clamped state, an unclamped lamp (second display lamp) 114, which is illuminated when the arm 22 is in an unclamped state, and a power source lamp 116, which is illuminated when power is supplied. The clamped lamp 112, the unclamped lamp 114, and the power source lamp 116 are positioned on a straight line separated mutually by predetermined distances, and preferably are set to different colors, respectively, to facilitate visibility thereof.

On the other hand, in the interior of the switch housing 92, the circuit board 94 is disposed in parallel and separated by a predetermined distance with respect to the body 18. The circuit board 94 is fixed with respect to the switch housing 92, and is formed with a predetermined length in the longitudinal direction of the switch housing 92.

As shown in FIGS. 1 through 7, the detection body 96 is made up from a holder 118 made of resin and formed with a substantially rectangular cross section, and a coil (detection element) 122 (see FIG. 4) housed in an accommodation hole 120 that opens in the holder 118. The coil 122 is sealed by a sealing body 124 in the interior of the hole.

Further, one side surface of the detection body 96 is connected to an end of the connecting arm 95, whereas the other side surface thereof opposite to the one side surface is disposed substantially in parallel with and separated a predetermined distance from the circuit board 94 (see FIG. 4). In addition, in a condition in which the other end of the connecting arm 95 is connected by bolts 125 to the knuckle block 64, the piston 48, the piston rod 50, and the knuckle block 64 are displaced in the axial direction (the direction of arrows A and B), whereby the detection body 96 is displaced along the circuit board 94 through the connecting arm 95.

More specifically, by movement of the detection body 96 along the circuit board 94, magnetism generated by the coil 122 is detected at first and second detection positions 126, 128, which are set beforehand on the circuit board 94 (see FIG. 4). The detected magnetism is output as a control signal to a non-illustrated controller through the output terminal 98 and the connector 104, whereby the angle of rotation of the arm 22 is detected based on the position of the detection body 96 in the axial direction (the direction of arrows A and B).

The clamping device 10 according to the embodiment of the present invention is constructed basically as described above. Next, operations and effects of the clamping device 10 will be described.

At first, the clamping device 10 is fixed in a predetermined position through a non-illustrated fixing means, and non-illustrated tubes, which are connected to a pressure fluid supply source, are connected respectively to the first and second fluid ports 38a, 40a. On the other hand, the connector 104, which is connected to the output terminal 98 of the detecting mechanism 24, is connected through the lead wire 106 to a non-illustrated controller, and a state is brought about in which the power source lamp 116 in the detecting mechanism 24 is energized and illuminated.

Figure 8:
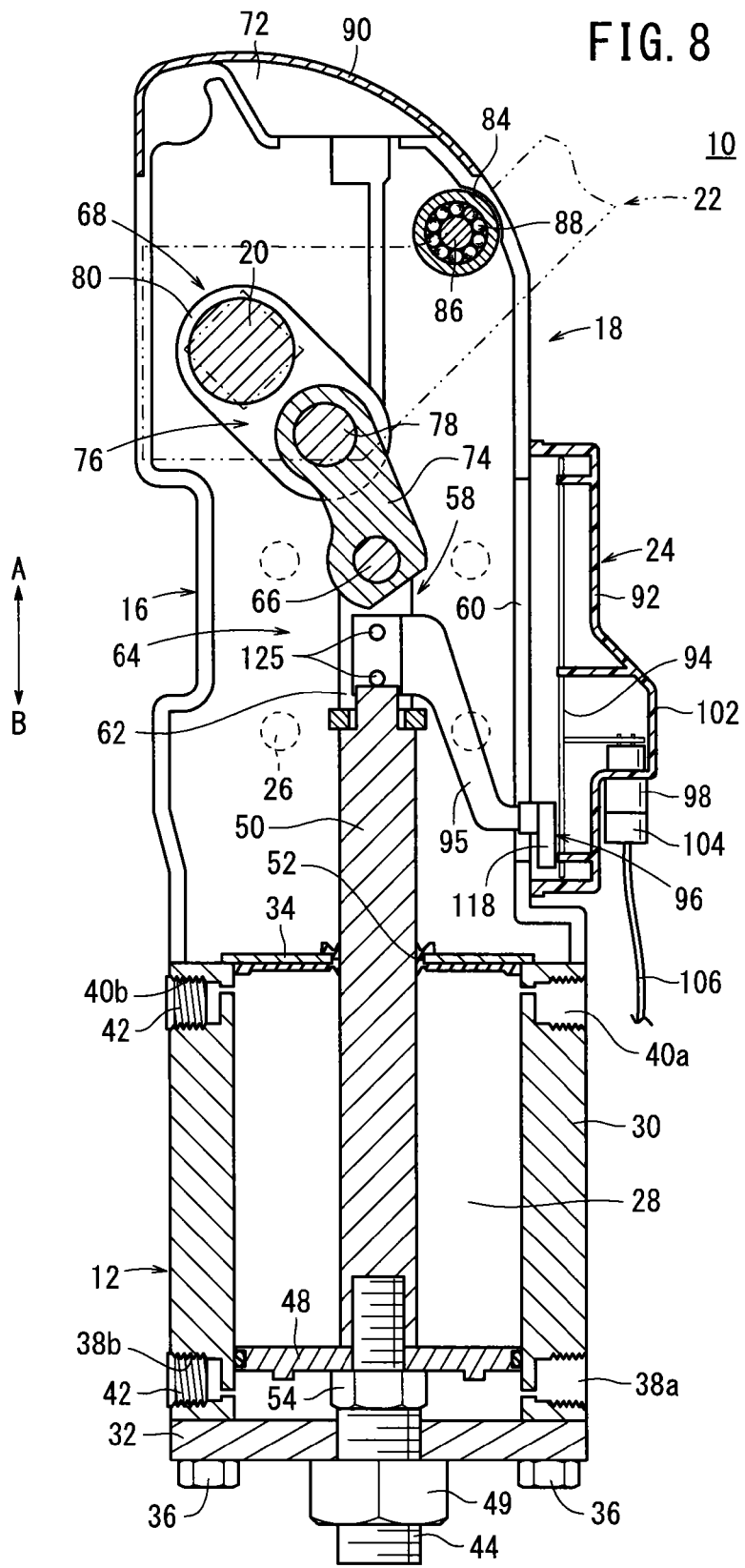
FIG. 8 is a vertical cross-sectional view with partial omission showing an unclamped state in which the arm is rotated through a predetermined angle in the clamping device of FIG. 3.

FIG. 3 shows a clamped state of the clamping device 10 in which a non-illustrated workpiece is clamped, and FIG. 8 shows an unclamped state of the clamping device 10. Below, the clamped state shown in FIG. 3 will be described as an initial condition.

In the clamped state of the arm 22, as shown in FIGS. 3 and 4, the detection body 96 is positioned upwardly inside the switch housing 92, and the first detection position 126 is set beforehand with respect to the circuit board 94 in facing relation to the detection body 96. More specifically, as shown in FIG. 4, when the detection body 96 is disposed in confronting relation to the first detection position 126, a control signal indicative of the clamped state is output from the circuit board 94 to the controller (not shown), whereby the clamped lamp 112 is energized through the circuit board 94 and is illuminated.

In this manner, in the initial condition of the clamping device 10 in which the clamped lamp 112 is illuminated, the pressure fluid is supplied from a non-illustrated pressure fluid supply source to the second fluid port 40a, and the pressure fluid is introduced into the cylinder chamber 28. Under action of the pressure fluid introduced to the cylinder chamber 28, the piston 48 is pressed in a direction (the direction of the arrow B) away from the body 18, and descends along the cylinder chamber 28 toward the end block 32. Additionally, upon displacement of the piston 48 and the piston rod 50, the knuckle block 64 is slidably displaced while being guided by the guide grooves (not shown). At this time, the first fluid port 38a is open to atmosphere.

During this time, the detection body 96 together with the connecting arm 95, which is connected to the knuckle block 64, descends along the circuit board 94 in the interior of the switch housing 92, and the detection body 96 separates away from the first detection position 126, accompanied by the magnetism of the coil 122 no longer being detectable in the first detection position 126. As a result, since the output signal to the controller becomes de-energized, it is confirmed in the controller that the clamped state of the clamping device 10 has been released. Simultaneously, energization from the circuit board 94 to the clamped lamp 112 of the display lamp 108 is terminated, and the illuminated state of the clamped lamp 112 is extinguished. Consequently, by extinguishing the illuminated state of the clamped lamp 112, the fact that the clamped state of the clamping device 10 has been released can reliably be recognized from the exterior of the clamping device 10. Moreover, at this time, the unclamped lamp 114 remains in a non-illuminated state.

Linear motion of the piston 48 is transmitted to the toggle link mechanism 68 through the piston rod 50 and the knuckle joint 58, and is converted into rotational motion of the arm 22 under a rotary action of the support lever 76 that makes up the toggle link mechanism 68. More specifically, in accordance with linear motion of the piston 48, a force is brought about, which acts to pull the link plate 74 and the knuckle joint 58 connected to the piston rod 50 downwardly (in the direction of the arrow B).

In addition, the pulling force applied to the link plate 74 causes the link plate 74 to be rotated through a predetermined angle about the knuckle pin 66, together with the support lever 76 being rotated in a clockwise direction under a linking action of the link plate 74, whereby the arm 22 is rotated through a predetermined angle about the bearings 20 of the support lever 76. Further, upon abutment of the connecting bolt 54 connected to the piston 48 against the damper 46 of the adjustment bolt 44 that is screw-engaged with the end block 32, displacement of the piston 48 is regulated, and rotational displacement of the arm 22 through the piston rod 50 and the toggle link mechanism 68 is stopped.

As a result, as shown in FIG. 8, the clamping device 10 is placed in an unclamped state in which the arm 22 is rotated clockwise through a predetermined angle away from the clamped state, and the detection body 96 descends and is placed in a state at which the detection body 96 confronts the second detection position 128 of the circuit board 94.

In addition, after magnetism from the coil 122 of the detection body 96 is detected at the second detection position 128, the detected magnetism is output as a control signal to the non-illustrated controller, whereby the unclamped state of the clamping device 10 is confirmed, together with the unclamped lamp 114 of the display lamp 108 being energized through the circuit board 94 and becoming illuminated.

The second detection position 128 of the circuit board 94 is set beforehand at a position (refer to the two-dot dashed line in FIG. 4) where the detection body 96 confronts the second detection position 128 in the unclamped state of the arm 22.

On the other hand, in the unclamped state of the clamping device 10 shown in FIG. 8, under the action of a non-illustrated switching valve, pressure fluid is supplied to the first fluid port 38*a*, and the piston 48 is displaced toward the body 18 (in the direction of the arrow A). At this time, the second fluid port 40*a* is open to atmosphere. In addition, upon displacement of the piston rod 50 together with the piston 48 toward the body 18 (in the direction of the arrow A), the support lever 76 is rotated in the opposite direction through the link plate 74 that constitutes the toggle link mechanism 68, accompanied by the arm 22 being rotated toward the non-illustrated workpiece.

At this time, the detection body 96 is displaced upwardly (in the direction of the arrow A) along the circuit board 94 through the connecting arm 95 that is connected to the knuckle block 64, and by the detection body 96 being brought to a position where the detection body 96 confronts the first detection position 126 of the circuit board 94, magnetism from the coil 122 is detected and the detection body 96 is detected as having reached the first detection position 126. As a result, the fact that the detection body 96 has reached the first detection position 126 is output as an output signal to the non-illustrated controller through the output terminal 98 and the connector 104, and the clamped state of the clamping device 10 is confirmed. Further, the circuit board 94 suspends energization of the unclamped lamp 114 to turn off the unclamped lamp 114, whereas the clamped lamp 112 is energized and illuminated.

Next, a case will be described in which, in the above-described clamping device 10, the angle of rotation of the arm 22 is adjusted by the adjustment bolt 44, accompanied by performing an adjustment of the detecting mechanism 24. A case shall be explained in which the angle of rotation of the arm 22 is made smaller than that of the above-described clamping device 10, and more specifically, wherein the unclamped position of the arm 22 is changed.

First, the adjustment bolt 44 is screw-rotated such that the length of the end of the adjustment bolt 44 that protrudes toward the body 18 (in the direction of the arrow A) is increased, and then the adjustment bolt 44 is fixed in place by the lock nut 49. Accordingly, when the arm 22 is switched from the clamped state to the unclamped state, since the end of the adjustment bolt 44 is moved more toward the body 18 compared with the case of the above-described clamping device 10, the amount by which the piston 48 is displaced downward is made shorter. Owing thereto, the angle of rotation of the arm 22, which is rotationally displaced through the toggle link mechanism 68 upon displacement of the piston 48, also becomes smaller.

Next, after the connecting bolt 54 fastened to the piston 48 is brought into abutment against the adjustment bolt 44 and the arm 22 is confirmed to be in the unclamped state, by an operator pressing the setting button 110 of the detecting mechanism 24, in the circuit board 94, the region thereof confronted by the detection body 96 is set as a new second detection position 128. More specifically, since the unclamped position is changed by changing the angle of rotation of the arm 22 by way of the adjustment bolt 44, by pressing the setting button 110, the second detection position 128 at which the unclamped state is detected is reset on the circuit board 94.

Consequently, even in the event that the angle of rotation of the arm 22 is changed, since the second detection position 128 with respect to the circuit board 94 can easily be reset by the setting button 110, the unclamped position of the arm 22, which has been changed, can be detected reliably and highly accurately by the detecting mechanism 24.

In the foregoing manner, with the present embodiment, even in the case that the angle of rotation of the arm 22 is changed in the clamping device 10, by pressing the setting button 110 of the detecting mechanism 24 in the unclamped state of the arm 22, the second detection position 128 of the circuit board 94 confronting the detecting mechanism 24 can be reset. Owing thereto, for example, it is unnecessary for an adjustment operation to be carried out by removing the detecting mechanism 24 from the body 18 every time that the angle of rotation of the arm 22 is changed, and thus the adjustment operation of the detecting mechanism 24 with respect to changes in the angle of rotation can easily be performed. As a result, adjusting the angle of rotation of the arm 22 can be performed reliably and efficiently.

Further, since the clamped and unclamped states of the arm 22 can be detected electrically in the detecting mechanism 24, the rotational state of the arm 22 can be confirmed with greater accuracy.

Furthermore, since the clamped and unclamped states of the arm 22 can be confirmed more easily and reliably from the exterior by the clamped lamp 112 and the unclamped lamp 114 in the display lamp 108, for example, even in an installation environment where it may be difficult to visually perceive the rotational state of the arm 22 (for example, in a dark location), an advantage results in that the rotational state of the arm 22 can be confirmed reliably by confirming the state of the display lamp 108.

Further still, in the above-described embodiment, although a case has been described in which resetting of the second detection position 128 for detecting the unclamped state of the arm 22 is performed by the setting button 110, the invention is not limited to this feature. For example, an arrangement may be provided in which the first detection position 126 for detecting the clamped state of the arm 22 is reset by the setting button 110.

The clamping device according to the present invention is not limited to the embodiments described above. It goes without saying that various alternative or additional structures could be adopted therein without departing from the essential scope of the present invention as set forth in the appended claims.

The invention claimed is:

1. A clamping device to clamp a workpiece with a clamp arm, by converting linear motion in a cylinder into rotational motion through a toggle link mechanism, the clamping device comprising:
   a main body portion;
   a cylinder connected to the main body portion and including a piston and a piston rod therein which is displaced in an axial direction under a pressing action of a pressure fluid;
   an adjustment mechanism disposed displaceably in the cylinder, and to adjust a stroke displacement amount of the piston by regulating displacement of the piston;
   a detecting mechanism including a detection body that is stroke-displaced together with the piston and the piston rod, and a detecting section to detect a position of the detection body, the detecting mechanism detecting clamped and unclamped states of the workpiece by the clamp arm by detecting, with the detecting section, a position at which the detection body is stroke-displaced; and
   a switch to set a detection position of the detection body by the detecting section, when the stroke displacement amount is adjusted by the adjustment mechanism,
   wherein the switch is connected electrically with respect to the detecting section, and sets the detection position of the detecting section corresponding to the unclamped state, by being pressed in a case that the clamp arm is in the unclamped state,
   wherein the detection body is movable along the detecting section and within a periphery thereof based on the stroke displacement amount throughout the clamped and unclamped states, and
   wherein the detecting section includes a circuit board along which the detection body is movable.

2. The clamping device according to claim 1, the detection body comprising:
   a holder which is supported by a connecting arm that is connected to the piston rod; and
   a detection element providing magnetism and which is accommodated in the interior of the holder,
   wherein the magnetism of the detection element is detected by the detecting section.

3. The clamping device according to claim 2, wherein the detecting mechanism comprises a display lamp that is illuminated in the clamped state and the unclamped state of the workpiece, the display lamp being disposed in the detecting mechanism at a position where the display lamp can be perceived visually from exterior.

4. The clamping device according to claim 3, wherein the detection element comprises a coil.

5. The clamping device according to claim 4, wherein the display lamp comprises:
   a first display lamp that is illuminated in the clamped state; and
   a second display lamp that is illuminated in the unclamped state,
   wherein the first display lamp and the second display lamp have different colors respectively.

6. The clamping device according to claim 1, wherein the detecting body is movable parallel with the circuit board.

7. A clamping device to clamp a workpiece with a clamp arm, by converting linear motion in a cylinder into rotational motion through a toggle link mechanism, the clamping device comprising:
   a main body portion;
   a cylinder connected to the main body portion and including a piston and a piston rod therein which is displaced in an axial direction under a pressing action of a pressure fluid;
   an adjustment mechanism disposed displaceably in the cylinder, and to adjust a stroke displacement amount of the piston by regulating displacement of the piston;
   a detecting mechanism including a detection body that is stroke-displaced together with the piston and the piston rod, and a detecting section to detect a position of the detection body, the detecting mechanism detecting clamped and unclamped states of the workpiece by the clamp arm by detecting, with the detecting section, a position at which the detection body is stroke-displaced; and
   a position setting mechanism to set a detection position of the detection body by the detecting section, when the stroke displacement amount is adjusted by the adjustment mechanism,
   wherein the detection body comprises:
      a holder that is supported by a connecting arm connected to the piston rod; and
      a detection element providing magnetism and which is accommodated in the interior of the holder,
   wherein the magnetism of the detection element is detected by the detecting section, and
   wherein the detecting section comprises a circuit board arranged in parallel with a stroke-displacement of the detection body so that the detection body can move along the circuit board.

8. The clamping device according to claim 7, wherein the detection element comprises a coil.

9. The clamping device according to claim 7, wherein the detecting mechanism comprises a display lamp that is illuminated in the clamped state and the unclamped state of the workpiece, the display lamp being disposed in the detecting mechanism at a position where the display lamp can be perceived visually from exterior.

10. The clamping device according to claim 9, wherein the display lamp comprises:
    a first display lamp that is illuminated in the clamped state; and
    a second display lamp that is illuminated in the unclamped state,
    wherein the first display lamp and the second display lamp have different colors respectively.

11. A clamping device to clamp a workpiece with a clamp arm, by converting linear motion in a cylinder into rotational motion through a toggle link mechanism, the clamping device comprising:
    a main body portion;
    a cylinder connected to the main body portion and including a piston and a piston rod therein which is displaced in an axial direction under a pressing action of a pressure fluid;
    an adjustment mechanism disposed displaceably in the cylinder, and to adjust a stroke displacement amount of the piston by regulating displacement of the piston;
    a detecting mechanism including a detection body that is stroke-displaced together with the piston and the piston rod, and a detecting section to detect a position of the detection body, the detecting mechanism detecting clamped and unclamped states of the workpiece by the clamp arm by detecting, with the detecting section, a position at which the detection body is stroke-displaced; and a position setting mechanism to set a detection position of the detection body by the detecting section, when the stroke displacement amount is adjusted by the adjustment mechanism, wherein the detection body is movable along the detecting section based on the stroke displacement amount throughout the clamped and unclamped states, and wherein the detecting section includes a circuit board along which the detection body is movable.

12. The clamping device according to claim 11, wherein the detecting body is movable parallel with the circuit board.

* * * * *